UNITED STATES PATENT OFFICE.

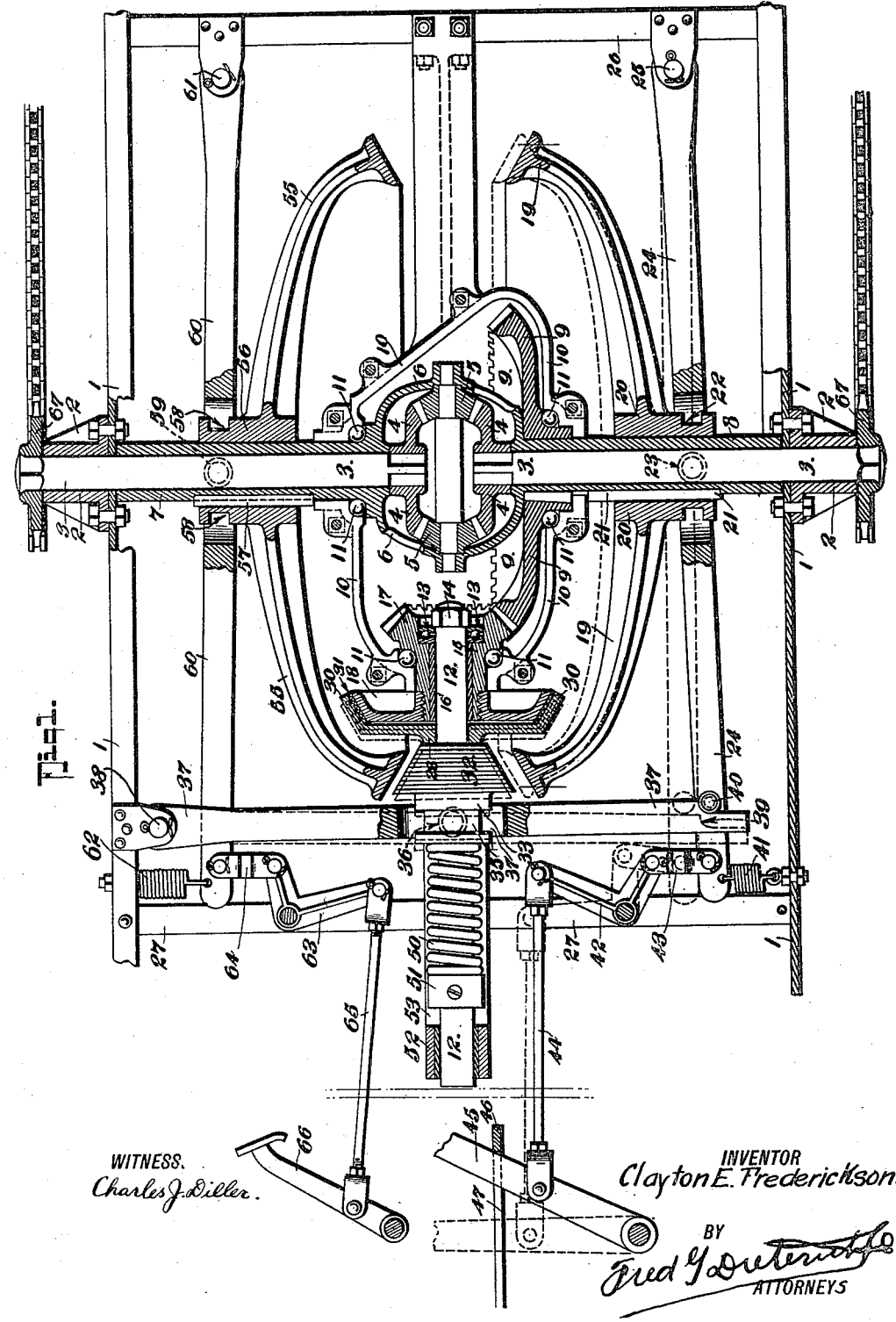

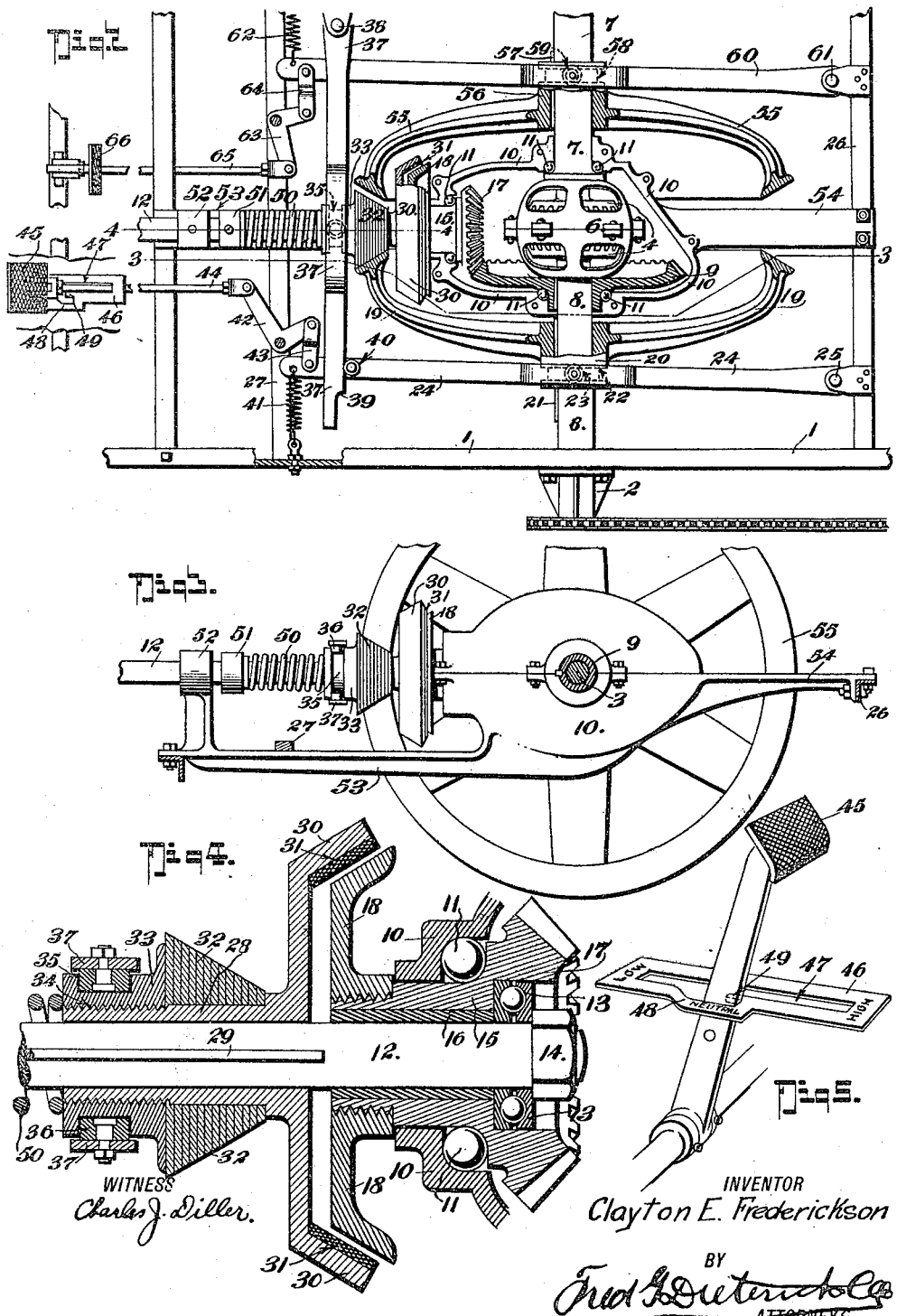

CLAYTON E. FREDERICKSON, OF CHICAGO, ILLINOIS, ASSIGNOR OF ONE-HALF TO GRACE C. STENGER, OF CHICAGO, ILLINOIS.

POWER-TRANSMITTING MECHANISM.

1,205,184.  Specification of Letters Patent.  Patented Nov. 21, 1916.

Application filed March 20, 1915. Serial No. 15,855.

*To all whom it may concern:*

Be it known that I, CLAYTON E. FREDERICKSON, residing at Chicago, in the county of Cook and State of Illinois, have invented certain new and useful Improvements in Power-Transmitting Mechanism, of which the following is a specification.

The present invention relates especially to the art of power transmission for automobiles and the like, wherein means are provided for changing the speed of rotation of the driven parts and reversing their direction of operation at the will of the operator. Mechanisms for this purpose, that have heretofore come into more or less extended use, may be divided into three general classes, *i. e.*, the sliding or shifting gear type, in which one or more gears are selectively brought into and out of mesh to effect the desired gear ratio; the planetary type wherein the gears employed always remain in mesh, the operative act being performed by arresting selected gears or gear groups in their orbits; and the friction drive type, in which the change in speed and reverse is effected by shifting one of two frictionally engaged elements outwardly or inwardly with respect to the axis of rotation of the other element. Each type has its advantages and disadvantages; the principal objection to the first mentioned type is the danger, always present, of "racking" or breaking the gear teeth in shifting into mesh; while the principal objection to the third type is the rapid wear between the engaging faces of the friction gear elements; the principal objection to the second type residing in the necessity of employing a large number of gear elements, the rapid wear on the transmission bands, which causes chattering when the same are applied, and the noise produced when running in low and reverse gear positions.

It is therefore one of the principal objects of my invention to provide a transmission mechanism which while retaining the advantages of both the friction and planetary types will, in a large measure, eliminate the objectionable features of the same.

Another object of my invention is to provide a transmission mechanism so designed and correlated to a differential mechanism as to constitute, with the same, a single unit, as it were, the construction being compact, strong and durable and the parts arranged for ready and convenient access.

Generically, the invention comprises a driving shaft and a driven shaft, the latter preferably being in two parts united by a differential gear connection, the master gear of which is driven from a pinion loose on the driving shaft, the pinion being provided with one element of a clutch, the other element of which is keyed to the driving shaft and has a shiftable sleeve that is provided with a driving element, preferably of the friction gear type, the master gear of the differential gear mechanism being mounted on one of the differential cage sleeves, two of which are provided, one on each shaft section.

The invention also includes low speed and reverse gears keyed to and slidable on the cage sleeves and designed to be brought into engagement with the driving element, at the will of the operator, by reverse manipulation from adjacent to the driver's seat or on the foot-board of the automobile.

The invention also provides means for automatically disengaging the clutch elements before the high and low speed gears are brought into engagement with the driving element and the invention also resides in those novel details of construction, combination and arrangement of parts, all of which will first be fully described, then be specifically pointed out in the appended claims and illustrated in the accompanying drawings, in which:—

Figure 1 is a plan view, partly in section illustrating the normal or high speed (direct) drive position in full lines, and the "neutral" position of the same in dotted lines. Fig. 2 is a top plan view, parts being broken away showing the "low" speed position of the parts. Fig. 3 is a detail section on the line 3—3 on Fig. 2. Fig. 4 is an enlarged detail section on the line 4—4 of Fig. 2. Fig. 5 is a detail perspective view of the pedal that controls the forward drive of the parts.

In the drawings, in which like numerals and letters of reference designate like parts in all of the figures, 1 represents the chassis frame of the automobile, cycle car or other self-moving vehicle of that type, and 2 designates the shaft bearings in which the two shaft sections 3 are mounted. The shaft sections 3 may be and preferably are in the nature of countershafts and carry sprockets 67 from which drive chains take the power to the rear axle (not shown) of the vehicle in the usual manner. Each shaft section 3, at the adjacent ends, is provided with a gear 4 that meshes with the differential pinions 5 which are carried in bearings in the cage 6, the cage 6 being provided with sleeves 7 and 8 journaled on the shaft sections 3.

9 is the master gear of the differential mechanism that is keyed to the sleeve 8 and meshes with the driving pinion 17.

10 designates the differential housing which may be of the usual type and which is supported by brackets 53 and 54 from the frame of the machine.

Suitable ball bearings 11 are provided where needed, as shown in the drawings.

12 designates the driving shaft, the end of which projects into the differential housing 10 and on which is mounted loosely the gear 17 whose hub 15 is suitably bushed with a bearing metal 16 and is also provided with one element of the cone clutch 18. The shaft 12 is provided with a thrust bearing 13 that is countersunk into the gear 17 and is retained by a nut 14 on the shaft 12.

19 designates the low speed driving gear which is of the friction type and has its hub 20 slidably keyed at 21 on the sleeve 8, the gear 19 being adapted to be shifted by a lever 24 which is fulcrumed at 25 to a bracket from the cross bar 26 of the frame and which is provided with rollers 23 that enter the groove 22 on the hub 20 of the gear 19, a spring 41 being provided for holding the lever 24 to keep the gear 19 normally disengaged from the driving element 32. The driving element 32 is in the nature of a cone composed of laminated fiber or other suitable material secured on the hub 28 of the second element 30 of the cone clutch, the element 30 being lined at 31 by a suitable clutch lining to coöperate with the element 18. The sleeve 28 is threaded at 34 to receive the sleeve 33 which jams the laminæ of the driving element 32 together. The sleeve 28 is slidable on the shaft 12 and is keyed at 29 thereto to turn with the shaft.

35 is a groove in the hub 33 in which the rollers 36 that are carried by the shifting lever 37 take. The lever 37 is fulcrumed at 38 to a bracket from the frame of the machine and has a shoulder 39 to be engaged by the roller 40 on the lever 24, whereby when the lever 24 is moved from the full line position to the dotted line position in Fig. 1, the lever 37 will also be moved from the full line to the dotted line position indicated to disengage the clutch elements 18 and 30.

Mounted on a cross bar 27 of the frame is a bell crank 42 which is linked at 43 to the lever 24 and is connected by a connecting rod 44 with the pedal 45 that projects through a slotted plate 46, the slot 47 of which has a lateral branch 48 terminating in a seat 49 to hold the lever 37 in the mid or neutral position.

50 is the clutch spring which continuously tends to bring the clutching elements 18 and 30 into engagement, the spring 50 being mounted on the shaft 12 and abutting a collar 51.

52 is a bearing bracket for the shaft 12 that projects upwardly from the bracket or brace 53.

55 is the low speed gear which is similar in construction to the gear 19 and which has its hub 56 grooved at 58 to receive rollers 59 on the lever 60, the hub 56 being keyed to the sleeve 7 but slidable longitudinally on the same. The lever 60 is pivoted at 61 to a bracket projection from the cross bar 26 and is normally held retracted by a spring 62.

63 is a bell crank fulcrumed on the cross bar and linked at 64 with the lever 60 and connected at 65 with the reverse pedal 66.

In operation when the operator moves the pedal or lever 45 forwardly, (it being understood that at this time he does not engage lever 66 which is held retracted through the intervention of the spring 62) the first action produced is by roller 40 rolling up the shoulder 39 and moving the lever 37 to the dotted line position in Fig. 1. At this time, gear 19 will also be in the dotted line position and there will be no power connections between the shaft 12 and gear 17. At this time also the pedal 45 will be in the mid position. Pushing the pedal forwardly as far as it will go brings the gear 19 into mesh with the driving element 32 and thus the low speed drive is imparted through the gear 19 to the differential sleeve 8 and consequently the shaft sections 3 are turned forwardly. In order to obtain the high speed drive, the pedal 45 is permitted to drop back into the right hand end of the slot 47 in Fig. 1 which brings the clutch members 18 and 30 together and disengages the gears 19, 55 and 32. To operate the reverse drive, the operator holds the pedal 45 in the neutral position by placing it in the neutral notch 48 (see Fig. 5) and then presses forwardly on pedal 66 which brings gear 55 into mesh with the driving element 32 and effects the reverse drive.

From the foregoing description taken in connection with the accompanying drawings, it is thought the complete construction, operation and advantages of my invention will be readily understood by those skilled in the art to which the invention appertains.

What I claim is:

1. In a power transmission mechanism, a driving shaft, a driven shaft, a pinion rotatably mounted on said driving shaft, a gear fixed on said driven shaft, a clutch element carried by said pinion, a shifting clutch element keyed on said driving shaft, a driving element carried by said driving shaft, a second gear shiftably keyed on said driven shaft, a clutch shifter, and mechanism for shifting said second gear into and out of engagement with said driving element.

2. In a power transmission mechanism, a driving shaft, a driven shaft element, continuously meshing gear connections between said driving shaft and said driven shaft element, said connections including a clutch element, a shiftable clutch element on the driving shaft to engage said first mentioned clutch element, a driving element, a second gear shiftable on the driven shaft element and adapted to be moved into and out of engagement with said driving element, and means for first disengaging said clutching elements and then engaging said second gear and drive element.

3. In a power transmission mechanism, a driving shaft, a driven shaft element, direct continuously meshing gear connections between said driving shaft and said driven shaft element, said connections including a clutch element, a shiftable clutch element on the driving shaft to engage said first mentioned clutch element, a driving element, a second gear shiftable on the driven shaft element and adapted to be moved into and out of engagement with said driving element, a device for shifting said shiftable clutch element out of engagement, another device for shifting said second gear into and out of engagement with said driving element.

4. In a power transmission mechanism, a driving shaft, a driven shaft element, direct continuously meshing gear connections between said driving shaft and said driven shaft element, said connections including a clutch element, a shiftable clutch element on the driving shaft to engage said first mentioned clutch element, a driving element, a second gear shiftable on the driven shaft element and adapted to be moved into and out of engagement with said driving element, a device for shifting said shiftable clutch element out of engagement, another device for shifting said second gear into and out of engagement with said driving element, and a connection between said devices whereby the action of the gear shifting device will operate the clutch shifting device.

5. In a power transmission mechanism, a driving shaft, a driven shaft element, direct continuously meshing gear connections between said driving shaft and said driven shaft element, said connections including a clutch element, a shiftable clutch element on the driving shaft to engage said first mentioned clutch element, a driving element, a second gear shiftable on the driven shaft element and adapted to be moved into and out of engagement with said driving element, a device for shifting said shiftable clutch element out of engagement, another device for shifting said second gear into and out of engagement with said driving element, and a connection between said devices whereby the initial part of the movement of the gear shifting device will actuate the clutch shifting device to release the clutch in advance of the engagement of the shiftable gear with the driving element.

6. In a power transmitting mechanism, a driving shaft, a driven shaft, gear connections between said shafts, said gear connections including a driving gear rotatable on the driving shaft, a clutch for coupling said gear to the driving shaft, a low speed gear on the driven shaft, a reverse gear on the driven shaft, a drive element on the drive shaft, means for holding said drive element and said low speed and reverse gears out of engagement, and shifting devices for engaging said low speed gear and said reverse gears respectively with said drive element.

7. In a power transmitting mechanism, a driving shaft, a driven shaft, gear connections between said shafts, said gear connections including a driving gear rotatable on the driving shaft, a clutch for coupling said gear to the driving shaft, a low speed gear on the driven shaft, a reverse gear on the driven shaft, a drive element on the drive shaft, means for holding said drive element and said low speed and reverse gears out of engagement, shifting devices for engaging said low speed gear and said reverse gears respectively with said drive element, and co-operative connections between the aforesaid parts operative upon the commencement of the movement of the gear shifting devices to disengage said clutch in advance of the engagement of the respective gear with said drive element.

8. The combination with the driving shaft, the driven shaft, and the gear mechanism between the same, of a clutch for effecting the connection between said driving shaft and said gear mechanism, a clutch shifter, a driving element on the driving shaft, a low speed gear on the driven shaft and adapted to engage with said drive element, means for holding said low speed gear out of engagement with said drive element and operator manipulated devices cooperative with the same for bringing said low speed gear and said drive element into engagement.

9. The combination with the driving shaft, the driven shaft, and the gear mechanism between the same, of a clutch for effecting the connection between said driving shaft and said gear mechanism, a clutch shifter, a driving element on the driving shaft, a low speed gear on the driven shaft and adapted to engage with said drive element, means for holding said low speed gear out of engagement with said drive element, operator manipulated devices coöperative with the same for bringing said low speed gear and said drive element into engagement, and a coöperative connection between said clutch shifter and said low speed gear manipulating element whereby to disengage said clutch and engage said low speed gear with said drive element.

10. In combination with the driving shaft, the driven shaft, a driving gear carried by the driving shaft, a driven gear on the driven shaft which continuously meshes with said driving gear, a clutch mechanism for connecting said driving gear with said driven shaft gear, said clutch mechanism including a shiftable clutch element, a friction driving element carried by said shiftable clutch element, a low speed friction gear and a reverse friction gear mounted on said driven shaft and adapted to be engaged with and disengaged from said friction element, means for first releasing said clutch and upon further movement engaging said low speed gear with said friction driving element, and other means for shifting said reverse gear member into and out of engagement with said friction driving element, said low speed and reverse gear members being of the friction type.

11. In combination with the driving shaft, the driven shaft, a driving gear carried by the driving shaft, a driven gear on the driven shaft which continuously meshes with said driving gear, a clutch mechanism for connecting said driving gear with said driven shaft gear, said clutch mechanism engaging a shiftable clutch element, a friction driving element carried by said shiftable clutch element, a low speed friction gear and a reverse friction gear mounted on said driven shaft and adapted to be engaged with and disengaged from said friction driving element, means for first releasing said clutch and upon further movement engaging said low speed gear with said friction driving element, other means for shifting said reverse gear member into and out of engagement with said friction element, said low speed and reverse gear members being of the friction type, and means for locking said low speed gear member out of engagement with said friction driving element and for locking said clutch in its clutched position.

CLAYTON E. FREDERICKSON.

Witnesses:
   J. H. IMHOFF,
   W. H. STENGER.

Copies of this patent may be obtained for five cents each, by addressing the "Commissioner of Patents, Washington, D. C."